US008317370B2

(12) United States Patent
Chien et al.

(10) Patent No.: US 8,317,370 B2
(45) Date of Patent: Nov. 27, 2012

(54) LIGHTING MODULE AND LIGHTING SYSTEM

(75) Inventors: Chao-Nan Chien, Hsinchu County (TW); Shang-Hsuang Wu, Hsinchu County (TW); Nien-Hui Hsu, Hsinchu County (TW); Chih-Cheng Chou, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 442 days.

(21) Appl. No.: 12/617,715

(22) Filed: Nov. 12, 2009

(65) Prior Publication Data

US 2010/0135025 A1 Jun. 3, 2010

(30) Foreign Application Priority Data

Nov. 28, 2008 (TW) .............................. 97146570 A

(51) Int. Cl.
*B60Q 1/06* (2006.01)
*F21S 8/00* (2006.01)

(52) U.S. Cl. ....................................... 362/373; 362/431

(58) Field of Classification Search .................. 362/373, 362/431

See application file for complete search history.

(56) References Cited

U.S. PATENT DOCUMENTS

| | | | | |
|---|---|---|---|---|
| 2005/0111234 | A1 * | 5/2005 | Martin et al. | 362/555 |
| 2006/0193139 | A1 | 8/2006 | Sun et al. | |
| 2008/0253080 | A1 | 10/2008 | He et al. | |
| 2008/0285265 | A1 * | 11/2008 | Boissevain | 362/218 |

FOREIGN PATENT DOCUMENTS

| | | |
|---|---|---|
| CN | 200986167 | 12/2007 |
| JP | 2005-196230 | 7/2005 |
| TW | M292042 | 6/2006 |
| TW | 200622434 | 7/2006 |
| TW | 200702590 | 1/2007 |
| TW | M307949 | 3/2007 |
| TW | I290777 | 12/2007 |
| TW | 200819866 | 5/2008 |
| TW | M342473 | 10/2008 |

OTHER PUBLICATIONS

"Third Office Action of China Counterpart Application with English Translation", issued on Dec. 7, 2011, p. 1-p. 16.

(Continued)

*Primary Examiner* — Diane Lee
*Assistant Examiner* — Sean Gramling
(74) *Attorney, Agent, or Firm* — Jianq Chyun IP Office

(57) ABSTRACT

A lighting module includes a light source, a heat sink, a case, and a fan. The light source has a light emitting surface and a bottom surface opposite thereto. The heat sink is disposed at the bottom surface of the light source and includes a heat sink mass having a heat dissipation surface, wherein the heat dissipation surface is opposite to the bottom surface. The case is disposed to the heat sink and has a module airflow inlet and a module airflow outlet. The fan is disposed to the case or the heat sink for driving airflow to sequentially pass through the module airflow inlet, the heat sink, and the module airflow outlet. The case is capable of making the flowing direction of the airflow passing the module airflow outlet the same as the light emitting direction of the light emitting from the light emitting surface.

12 Claims, 8 Drawing Sheets

OTHER PUBLICATIONS

"Office Action of Taiwan Counterpart Application with English Translation", issued on Nov. 30, 2011, p. 1-p. 6.

"Office Action of Taiwan Counterpart Application" with English translation thereof, issued on Jul. 29, 2011, p. 1-p. 14, in which the listed references were cited.

"First Office Action of China Counterpart Application", issued on Feb. 11, 2011, p. 1-p. 6, in which the listed references were cited.

"Second Office Action of China Counterpart Application", issued on Sep. 6, 2011, with English translation thereof, p. 1-p. 15.

* cited by examiner

LIGHTING MODULE AND LIGHTING SYSTEM

CROSS-REFERENCE TO RELATED APPLICATION

This application claims the priority benefit of Taiwan application serial no. 97146570, filed on Nov. 28, 2008. The entirety of the above-mentioned patent application is hereby incorporated by reference herein and made a part of specification.

BACKGROUND OF THE INVENTION

1. Field of the Invention

The invention generally relates to a lighting module and a lighting system, and more particularly, to a lighting module and a lighting system with good heat dissipation efficiency.

2. Description of Related Art

In recent years, along with the steady advancements of the light-emitting luminance and light-emitting efficiency of light-emitting diodes (LEDs), a light source using LEDs serving as a lighting apparatus is gradually developing. Since LEDs may produce heat during running, it is important to remove the heat produced by the LEDs to keep the LEDs within the operation temperature range. The common heat dissipation manner used in an LED's lighting apparatus today includes natural convection and forced convection.

The natural convection requires a heat sink with large area and the casing of a lighting apparatus having a number of openings with complex figures, so that the heat of the heat sink may be expelled outwards. However, the above-mentioned requirements make the lighting apparatus sizable and clumsy. In addition, for an outdoor lighting apparatus using LEDs, it is easier to accumulate sand dust at the opening of the casing of the above-mentioned outdoor lighting apparatus. Accordingly the heat dissipation efficiency may be decreased.

The forced convection needs fans to blow the heat sink so as to expel the heat of the heat sink outwards. For an outdoor lighting apparatus in forced convection mode employing LEDs as the light source, sand dust and rainwater easily follow the airflow and enter the lighting apparatus. In particular, when the fan is disposed near the airflow inlet and strong outdoor wind blows up, the strong wind may even destroy the bearing and the fan blades of the employed fan; moreover, the forced airflow inside the lighting apparatus is uneasily expelled outwards due to the strong wind.

SUMMARY OF THE INVENTION

Accordingly, the invention is directed to a lighting module with good heat dissipation capacity.

The invention is also directed to a lighting system employing the above-mentioned lighting module. The lighting module is able to prevent sand dust or rainwater from entering inside the lighting system.

An embodiment of the present invention provides a lighting module. The lighting module includes a light source, a heat sink, a case, and a fan. The light source has a light emitting surface and a bottom surface opposite to the light emitting surface and is capable of providing light emitted from the light emitting surface. The heat sink is disposed at the bottom surface of the light source and includes a heat sink mass with a heat dissipation surface, wherein the heat dissipation surface is opposite to the bottom surface. The case is disposed to the heat sink and has a module airflow inlet and a module airflow outlet. The fan is disposed to the case or the heat sink for driving an airflow to sequentially pass through the module airflow inlet, the heat sink, and the module airflow outlet. The case is capable of making the flowing direction of the airflow passing the module airflow outlet the same as the light emitting direction of the light emitted from the light emitting surface.

An embodiment of the invention provides a lighting system. The lighting system includes a system casing and a lighting module. The system casing has a top surface, a system airflow inlet, and a system airflow outlet, wherein the system airflow inlet, the system airflow outlet, and the top surface are located substantially at the same side of the system casing. A lighting module is disposed at the system casing and includes a light source, a heat sink, a case, and a fan. The light source has a light emitting surface and a bottom surface opposite to the light emitting surface and is capable of providing light emitted from the light emitting surface. The heat sink is disposed at the bottom surface of the light source and includes a heat sink mass with a heat dissipation surface, wherein the heat dissipation surface is opposite to the bottom surface. The case is disposed to the heat sink and has a module airflow inlet and a module airflow outlet. The fan is disposed to the case or the heat sink for driving an airflow to sequentially pass through the module airflow inlet, the heat sink, and the module airflow outlet. The case is capable of making the flowing direction of the airflow passing the module airflow outlet the same as the light emitting direction of the light emitted from the light emitting surface. The module airflow outlet is communicated with the system airflow outlet so that the airflow exiting from the module airflow outlet flows out of the system casing via the system airflow outlet.

In the above-mentioned embodiments of the invention, the module airflow outlet of the lighting module and the light source are located at the same side, and the flowing direction of the airflow of the module airflow outlet and the light emitting direction of the light emitting from the light emitting surface are substantially the same. When the light emitting surface of the light source in the lighting module is towards the ground for usage, sand dust or rainwater uneasily enters the case from the module airflow outlet. In addition, both the system airflow inlet and the system airflow outlet of the lighting system are located at the top surface of the system casing. When the top surface of the system casing in the lighting system is towards the ground for usage, the system casing may prevent sand dust or rainwater from entering the case through the system airflow inlet and the system airflow outlet.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
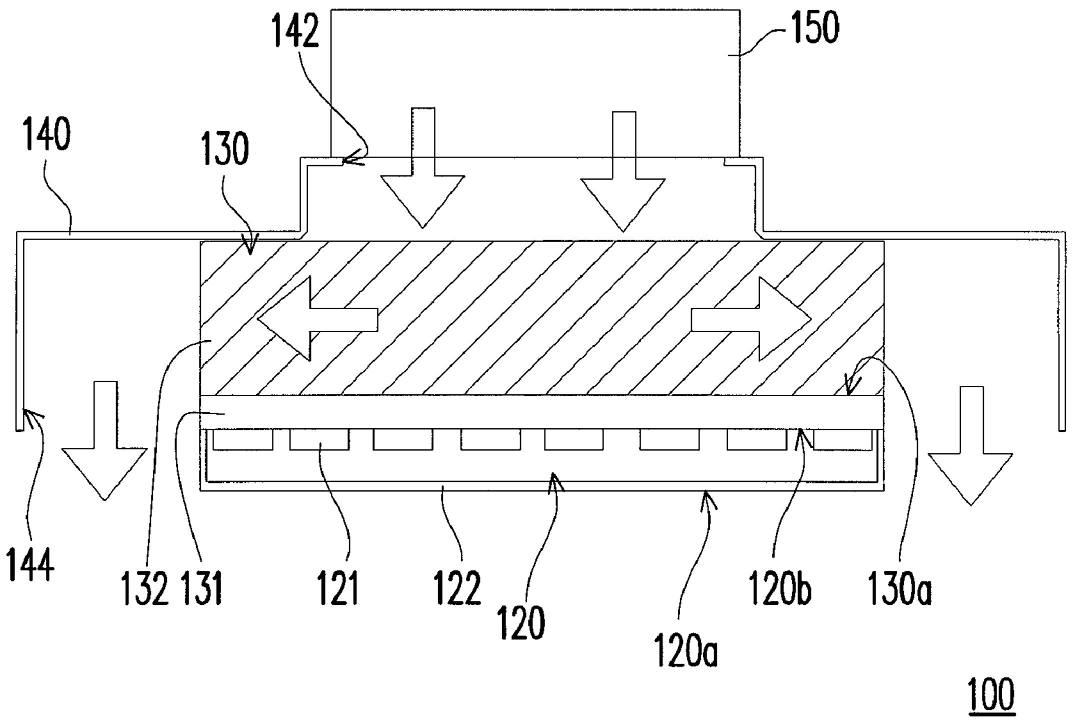
FIGS. 1A-5 are diagrams of lighting modules provided by several embodiments of the invention.

Referring to FIG. 1A, a lighting module 100 includes a light source 120, a heat sink 130, a case 140, and a fan 150.

In the embodiment, the light source 120 has a light emitting surface 120*a* and a bottom surface 120*b* opposite to the light emitting surface 120*a*. The light source 120 has a plurality of light-emitting parts 121. In the embodiment, a plurality of light-emitting parts 121 may obtain an increased luminance; in other embodiments, the light source 120 may be, for example, a single light-emitting part 121. The light-emitting parts 121 may be a plurality of LEDs, wherein the light come from the light-emitting parts 121 emits out from the light emitting surface 120*a*. The heat sink 130 includes a heat sink mass 131 with a heat dissipation surface 130*a*. The heat dissipation surface 130*a* is opposite to the bottom surface 120*b* of the light source 120. In addition, the heat sink 130 may include a plurality of dissipation fins 132. The dissipation fins 132 are disposed on the heat dissipation surface 130*a* to enhance the heat dissipation capacity of the heat sink mass 131. Since the light source 120 produces significant heat during emitting light, the heat sink mass 131 is disposed at the bottom surface 120*b* of the light source 120, so that the heat produced by the light source 120 during running may be transferred to the heat sink 130.

The case 140 is disposed to the heat sink 130 and has a module airflow inlet 142 and a module airflow outlet 144. The module airflow inlet 142 is adjacent to the fan 150 and the module airflow outlet 144 is adjacent to the light source 120. The module airflow outlet 144 is located on a geometry plane where the heat dissipation surface 130*a* is located on, and the module airflow outlet 144 and the light emitting surface 120*a* are substantially towards the same direction. In the embodiment, the module airflow outlet 144 is located at the left side and right side of the light source 120; in another unshown embodiment, the module airflow outlet 144 is not limited to be on the above-mentioned geometry plane or at the above-mentioned left side and right side. The module airflow outlet 144 may be located at a side of the geometry plane towards the light emitting direction of the light source 120 or at the front side and rear side of the light source 120.

The fan 150 is disposed to the case 140, and the light source 120, and the fan 150 are respectively located at the both opposite sides of the heat sink 130. In the embodiment, the fan 150 may be an axial fan, and the airflow entrancing direction and the airflow exiting direction thereof are the same. The airflow driven by the fan 150 passes through the module airflow inlet 142 and flows into a flow way formed by the case 140 and the heat sink 130. During the airflow is passing the heat sink 130, the heat accumulated on the heat sink 130 is taken away by the airflow, then is expelled out of the case 140 via the module airflow outlet 144.

In the embodiment, the module airflow outlet 144 and the light emitting surface 120*a* are designed to substantially face the same direction; i.e., the case 140 is capable of making the flowing direction of the airflow passing through the module airflow outlet 144 the same as the light emitting direction of the light emitting from the light emitting surface 120*a*. In this way, when the light emitting surface 120*a* of the light source 120 in the lighting module 100 is towards the ground for usage, sand dust or rainwater uneasily enter the case 140 via the module airflow outlet 144. In addition, the light source 120 may further have a transparent shade 122 enclosing the light source 120 thereon for protecting the light-emitting parts 121.

In the following embodiments, the lighting modules 100*a*, 200, 300, 400 and 500 are similar to the lighting module 100 of the above-mentioned embodiment, and the same parts or the similar parts in the following lighting modules are represented by the similar marks. The differences of the lighting modules 100*a*, 200, 300, 400 and 500 from the lighting module 100 are depicted hereinafter.

Figure 1B:
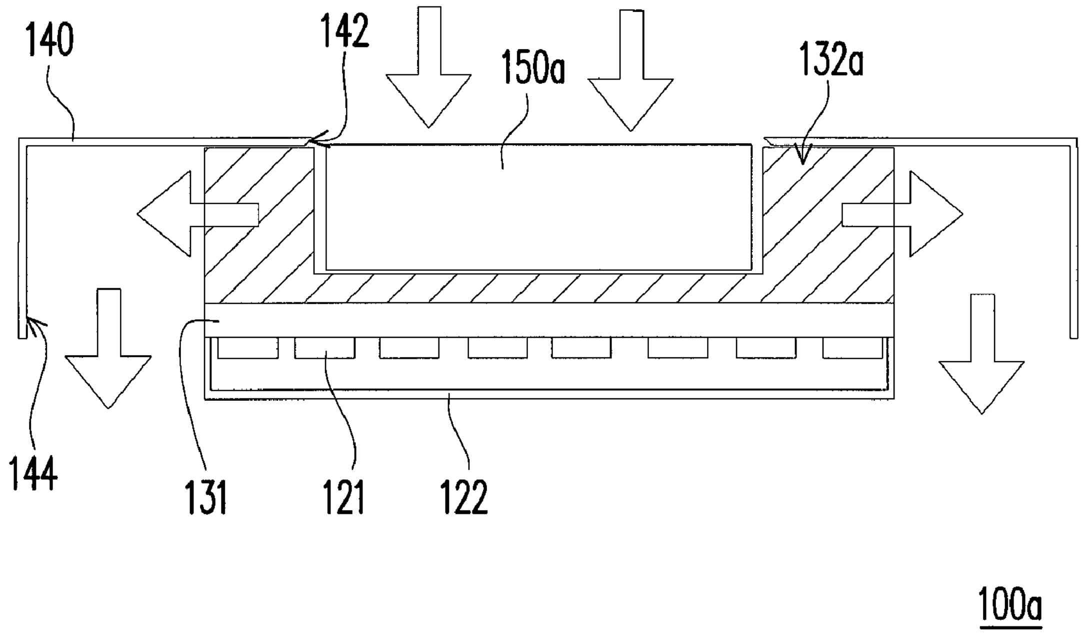

Referring to FIG. 1B, the difference of the lighting module 100*a* from the lighting module 100 in FIG. 1A rests that the fan 150*a* is disposed to the heat sink 130; in more details, the fan 150*a* is located between the dissipation fins 132*a*. In the embodiment, the fan 150*a* may be a centrifugal fan, and the airflow entrancing direction and the airflow exiting direction thereof are perpendicular to each other.

Figure 2:
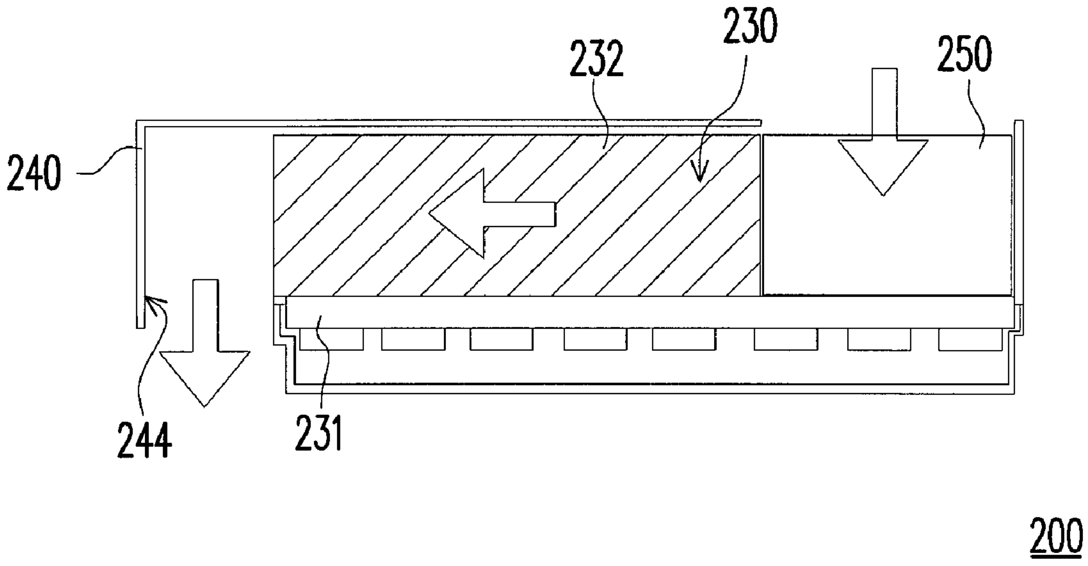

Referring to FIG. 2, in comparison with the lighting module 100 of FIG. 1, the fan 250 of FIG. 2 is disposed at a side of the heat sink 230; in more details, the fan 250 is disposed at the side of the dissipation fins 232. In the embodiment, the fan 250 may be a centrifugal fan.

Figure 3:
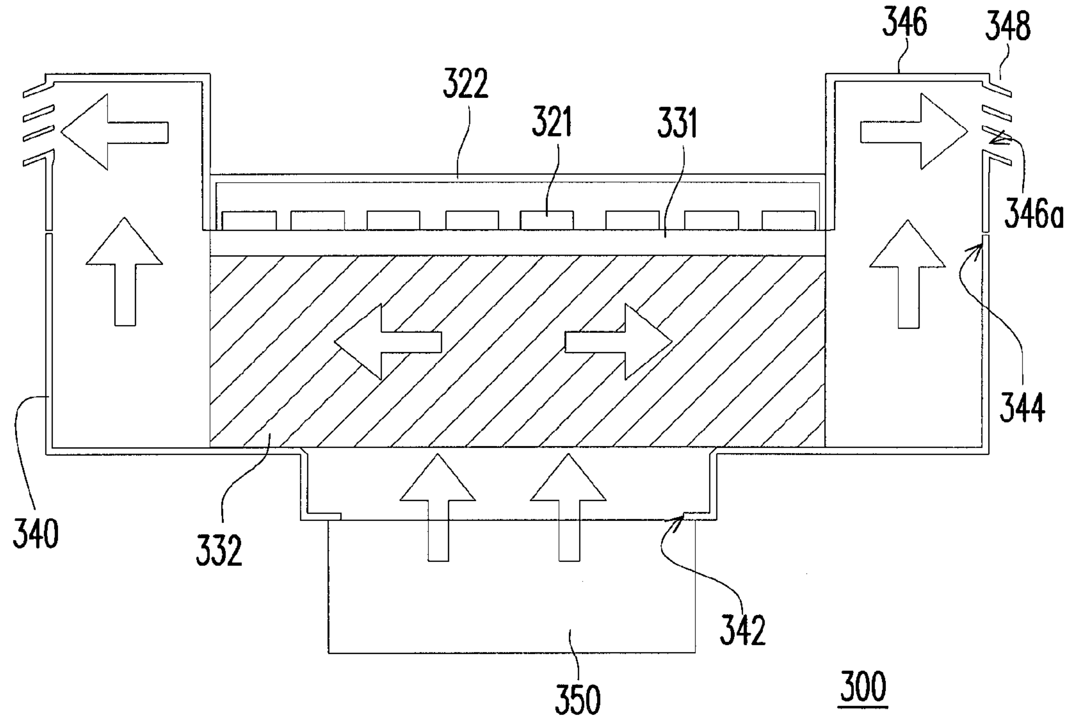

Referring to FIG. 3, in comparison with the lighting module of FIG. 1, the lighting module 300 of FIG. 3 has an additional guiding element 346 disposed at the module airflow outlet 344 for altering the exiting direction of the airflow so that the airflow is expelled from a guiding outlet 346*a*. In this way, when the lighting module 300 emits light in the direction opposite to the gravity direction, the light module 300 may prevent sand dust or rainwater from entering the case 340 via the module airflow outlet 344. In addition, a grid-shaped louver 348 facing the ground is disposed at the guiding outlet 346*a* to achieve the effects of anti-dust and anti-rain.

Figure 4:
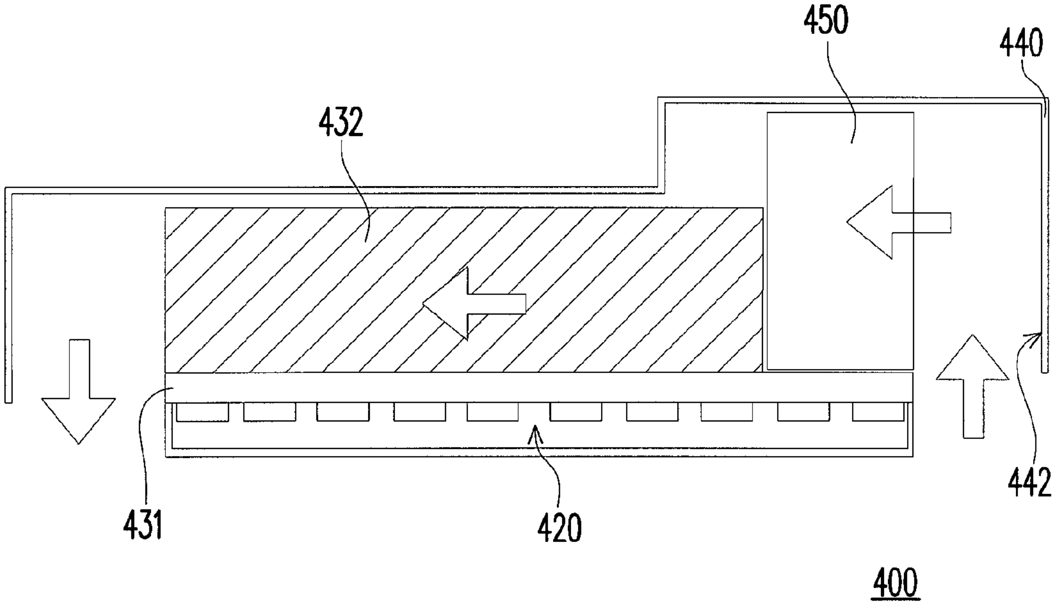

Referring to FIG. 4, in comparison with the lighting module 100 of FIG. 1, the fan 450 of the lighting module 400 in FIG. 4 is disposed at the side of the dissipation fins 432, so that the light source 420 and the fan 450 are respectively located at two adjacent sides of the dissipation fins 432. Besides, the module airflow inlet 442 of the case 440 is disposed under the case 440, so that the heat sink mass 431 and the module airflow inlet 442 are substantially located on a same geometry plane.

Figure 5:
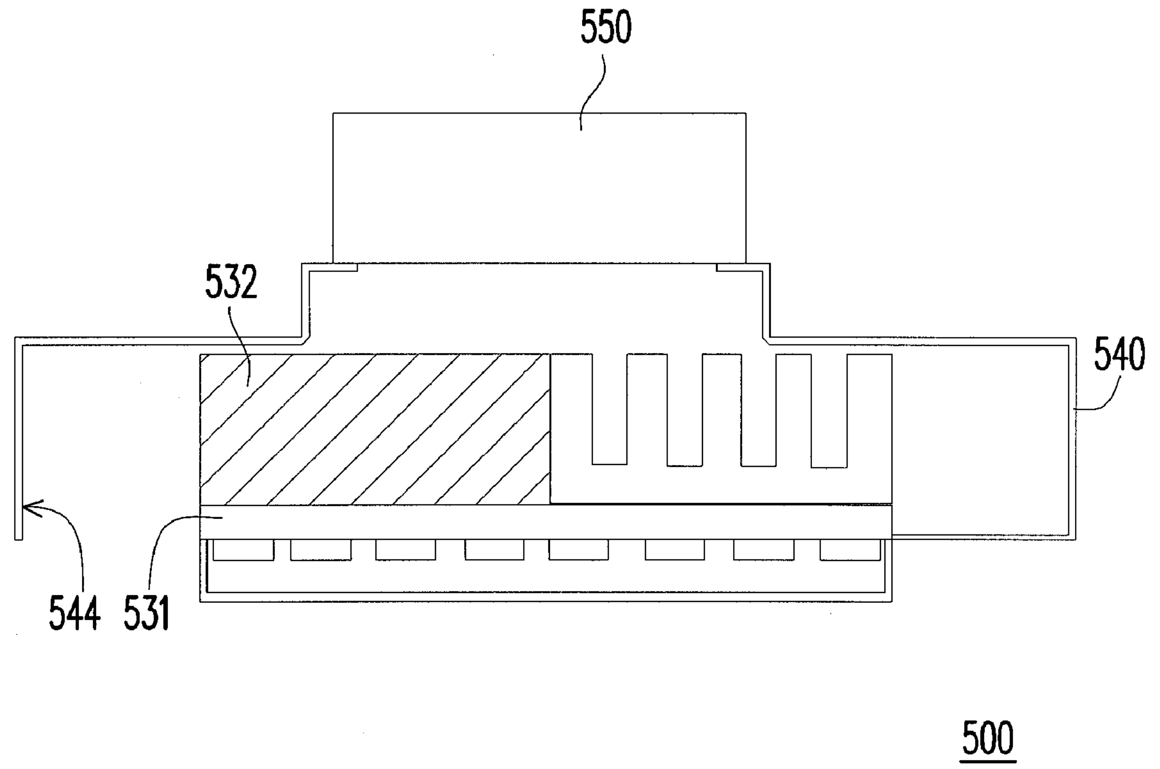
Figure 6:
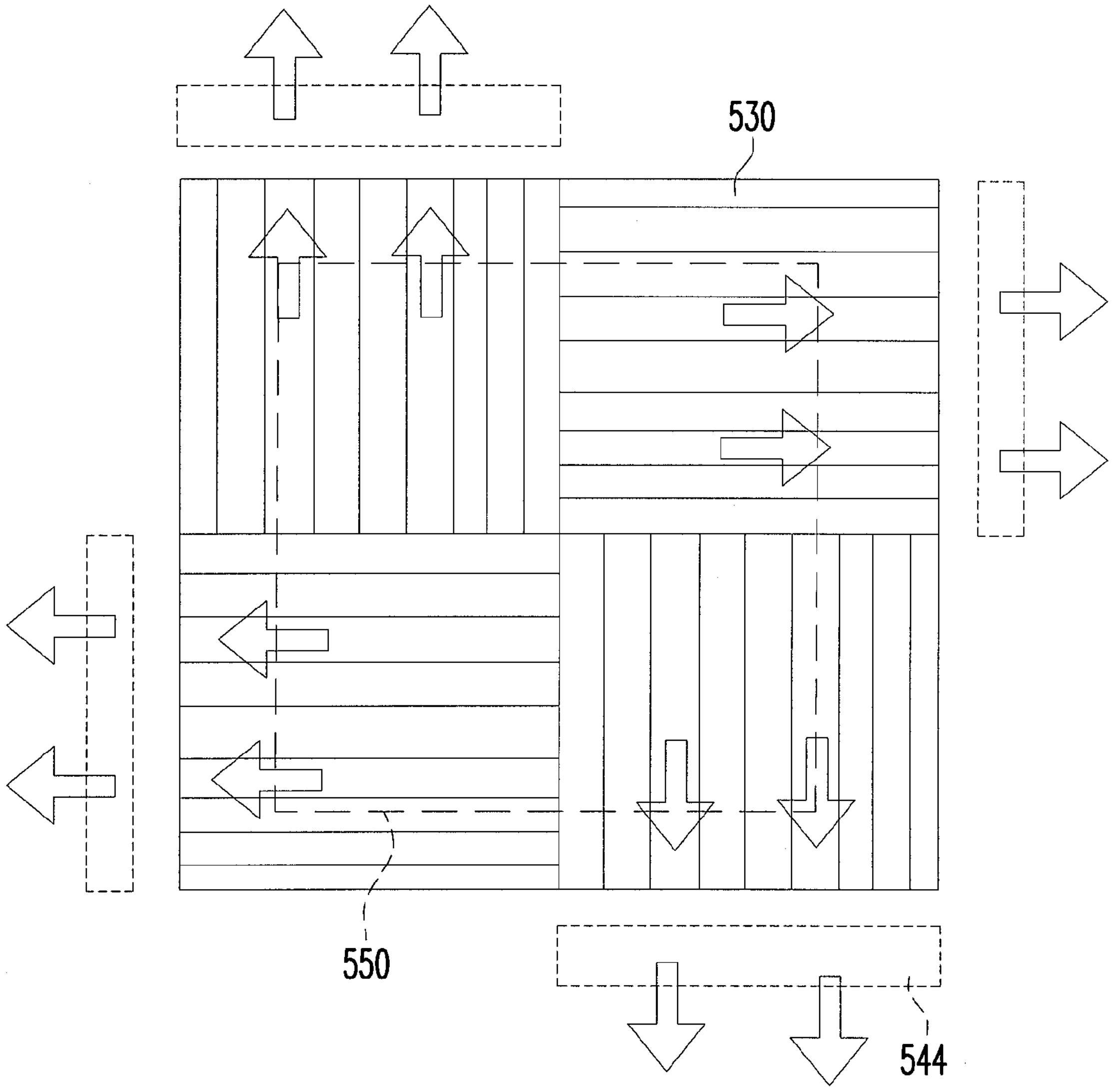
FIG. 6 is a diagram showing the heat sink, the module airflow outlet and the fan in FIG. 5.

Referring to FIGS. 5 and 6, in the embodiment, the lighting module 500 has a plurality of heat sinks 530 and the heat sinks 530 are arranged in way of rightly intersecting each other. The case 540 has a plurality of module airflow outlets 544 respectively corresponding to the heat sinks 530. The fan 550 is an axial fan, and the airflow produced by the fan passes through the heat sinks 530 arranged in way of rightly intersecting each other with a lower flow resistance.

Figure 7:
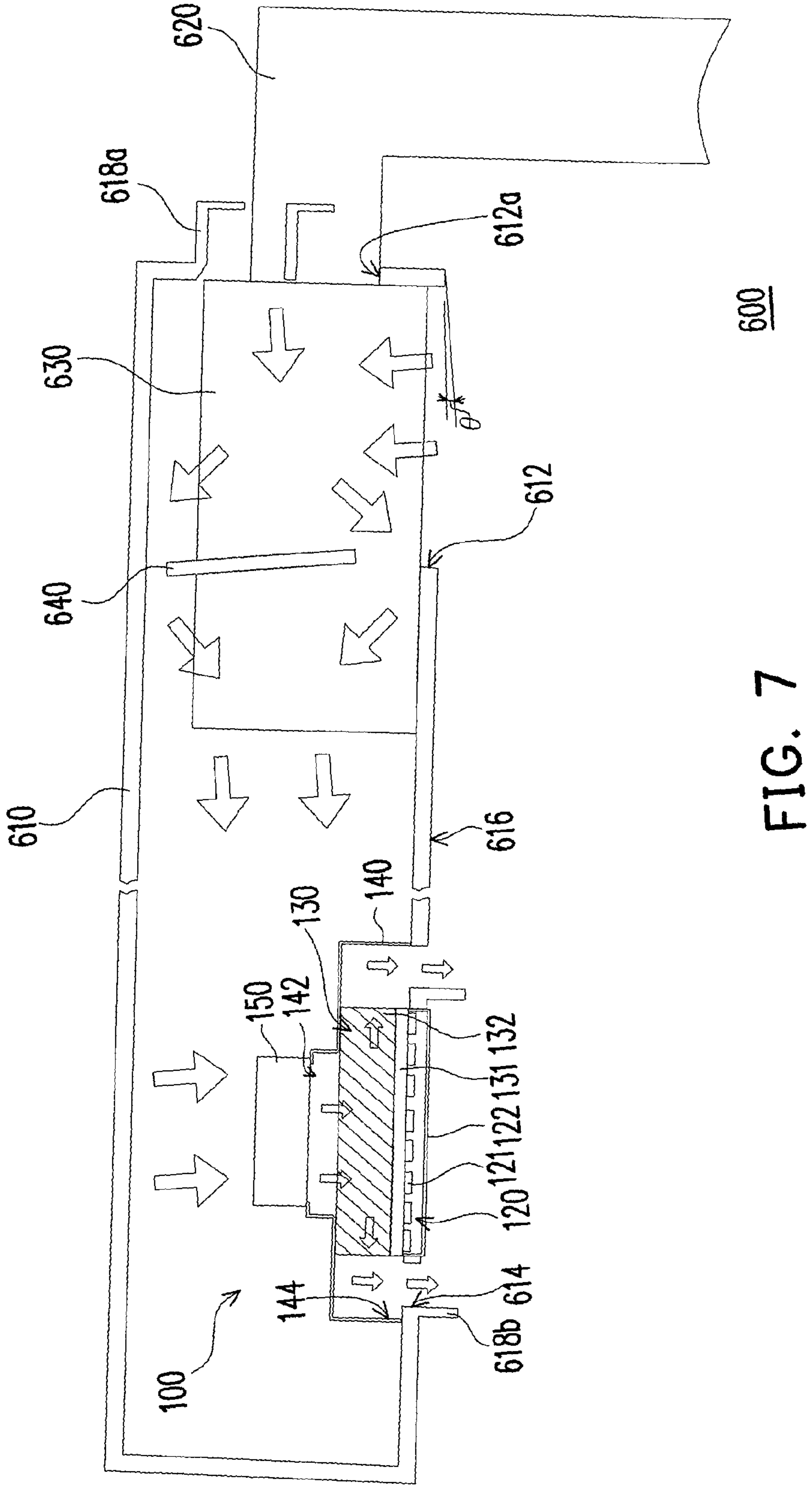
FIG. 7 is a diagram of a lighting system according to an embodiment of the present invention.

Referring to FIG. 7, the lighting system 600 of the embodiment includes a system casing 610 and a lighting module 100, wherein the lighting module 100 is just the one of the embodiment shown by FIG. 1. The lighting module 100 is disposed at the system casing 610 and is embedded into the system casing 610.

The system casing 610 has a system airflow outlet 614, a system airflow inlet 612 and a top surface 616. The top surface 616 is located under the system casing 610; there is an opening on the top surface 616 of the system casing 610, so that the light source 120 of the lighting module 100 can be exposed out of the system casing 610 by means of the opening and the light produced by the light source 120 can emit to a side of the top surface 616.

In the embodiment, the airflow entering from the system airflow inlet 612 is driven by the fan 150, then flows into the case 140 via the module airflow inlet 142, then passes through the heat sink 130 and finally is expelled out of the lighting module 100 via the module airflow outlet 144. Since the system airflow outlet 614 and the module airflow outlet 144 are communicated with each other, the airflow expelled from the module airflow outlet 144 may pass through the system airflow outlet 614 to exit out of the system casing 610.

When the lighting system 600 serves as an outdoor lighting apparatus (for example, a road light), the lighting system 600 further includes a lighting rod 620 and a base for fixing the lighting rod 630. The base for fixing the lighting rod 630 is located in the system casing 610, an end of the lighting rod 620 is fixed in the base for fixing the lighting rod 630 to make the system casing 610 connect the lighting rod 620; another end of the lighting rod 620 is fixed at the ground.

The system airflow inlet 612 and the system airflow outlet 614 are located under the system casing 610, so that the system airflow inlet 612, the system airflow outlet 614 and the top surface 616 are substantially located at the same side of the system casing 610. In this way, In addition, when the top surface 616 of the system casing 610 in the lighting system 600 faces the ground for usage, the system casing 610 may prevent sand dust or rainwater from entering the system casing 610 via the system airflow inlet 612 and the system airflow outlet 614.

In order to extend the lighting scope of the light sources 120 far from the lighting rod 620, the top surface 616 may be inclined to the ground, i.e., there is an acute included angle between the top surface 616 and the ground. Moreover, to prevent external strong wind directly blows the system airflow outlet 614 inclined to the ground and thereby to avoid interfering the expelling of the airflow in the lighting system 600, a baffle **618*b* is disposed beside the system airflow outlet 614. The baffle 618*b* functions to ensure the airflow in the system casing 610 exempted from the interference of strong wind and the airflow freely expelled out of the system airflow outlet 614. In addition, the baffle 618*b* is also able to prevent sand dust or rainwater under strong wind from entering the system casing 610**.

In addition to the above-mentioned system airflow inlet 612 located under the system casing 610, the lighting system 600 further has an auxiliary airflow inlet **612*a* disposed at a side wall of the system casing 610 adjacent to the top surface 616; and another baffle 618*a* is disposed beside the auxiliary airflow inlet 612*a* for preventing sand dust or rainwater along with the airflow from entering the system casing 610 via the auxiliary airflow inlet 612*a***.

The lighting system can further employ a turbulent part 640 disposed in the system casing 610, wherein the turbulent part 640 is located between the system airflow inlet 612 and the module airflow inlet 142 for avoiding the airflow from directly flowing into the module airflow inlet 142 via the auxiliary airflow inlet **612*a*, where the turbulent part 640 functions to block sand dust or rainwater to protect the lighting module 100**.

In summary, the embodiment of the invention has at least one of the following advantages, in the above-mentioned embodiment or embodiments of the invention, the module airflow outlet of the lighting module and the light emitting surface of the light source are located at the same side, and the module airflow outlet and the light emitting direction of the light emitting from the light emitting surface are substantially towards a same direction. When the light emitting surface of the lighting module faces the ground for usage, the present lighting module may prevent sand dust or rainwater from entering the case via the module airflow outlet.

In addition, in the above-mentioned embodiments of the invention, both the system airflow inlet and the system airflow outlet of the lighting system are located at the top surface of the system casing. When the top surface of the system casing in the lighting system faces the ground for usage, it may prevent sand dust or rainwater from entering the system casing via the system airflow inlet and the system airflow outlet.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lighting system, comprising:

a system casing, having a top surface, a system airflow inlet and a system airflow outlet, wherein the system airflow inlet, the system airflow outlet, and the top surface are located substantially at the same side of the system casing; and a lighting module, disposed at the system casing and comprising:

a light source, having a light emitting surface and a bottom surface opposite to the light emitting surface and capable of providing a light beam emitted from the light emitting surface;

a heat sink, disposed at the bottom surface of the light source and comprising a heat sink mass with a heat dissipation surface, wherein the heat dissipation surface is opposite to the bottom surface;

a case, disposed to the heat sink and having a module airflow inlet and a module airflow outlet; and a fan, wherein the case is disposed between the fan and the heat sink for driving an airflow to sequentially pass through the system airflow inlet, the fan, the module airflow inlet, the heat sink, the module airflow outlet, and the system airflow outlet, wherein the case is capable of making a flowing direction of the airflow passing the module airflow outlet the same as a light emitting direction of the light emitted from the light emitting surface, the module airflow outlet is communicated with the system airflow outlet for the airflow exiting from the module airflow outlet flowing out of the system casing via the system airflow outlet.

2. The lighting system as claimed in claim 1, wherein the system casing has a baffle located beside the system airflow outlet.

3. The lighting system as claimed in claim 1, wherein the system casing has an auxiliary airflow inlet and a baffle, the auxiliary airflow inlet is located at a side wall of the system casing, the side wall is adjacent to the top surface of the system casing, and the baffle is located beside the auxiliary airflow inlet.

4. The lighting system as claimed in claim 1, wherein the system casing has a turbulent part, and the turbulent part is disposed in the system casing and located between the system airflow inlet and the module airflow inlet.

5. The lighting system as claimed in claim 1, wherein the fan and the light source are respectively disposed at both opposite sides of the heat sink.

6. The lighting system as claimed in claim 1, wherein the heat sink further comprises a plurality of dissipation fins and the dissipation fins are disposed at the heat dissipation surface of the heat sink mass.

7. The lighting system as claimed in claim 6, wherein the fan is disposed at sides of the dissipation fins.

8. The lighting system as claimed in claim 1, wherein the light source of the lighting module further comprises at least a light-emitting part and a transparent shade, and the transparent shade encloses the light-emitting part.

9. The lighting system as claimed in claim 1, further comprising:

a lighting rod, having two ends, wherein an end of the lighting rod is connected to the system casing and another end of the lighting rod is fixed at the ground.

10. The lighting system as claimed in claim 9, further comprising:

a fixing base, fixed to inside the system casing, wherein the end of the lighting rod is connected to the system casing by fixing the end to the fixing base.

11. The lighting system as claimed in claim 9, wherein the top surface of the system casing is inclined to the ground.

12. The lighting system as claimed in claim 1, wherein the module airflow outlet is located on a geometry plane of the heat dissipation surface being located on or at a side of the geometry plane facing the light source, and the module airflow outlet and the light emitting surface are substantially towards the same direction.

* * * * *